J. W. HINRICKS.
AMUSEMENT APPARATUS.
APPLICATION FILED FEB. 23, 1917.
1,244,735.
Patented Oct. 30, 1917.
2 SHEETS—SHEET 2.
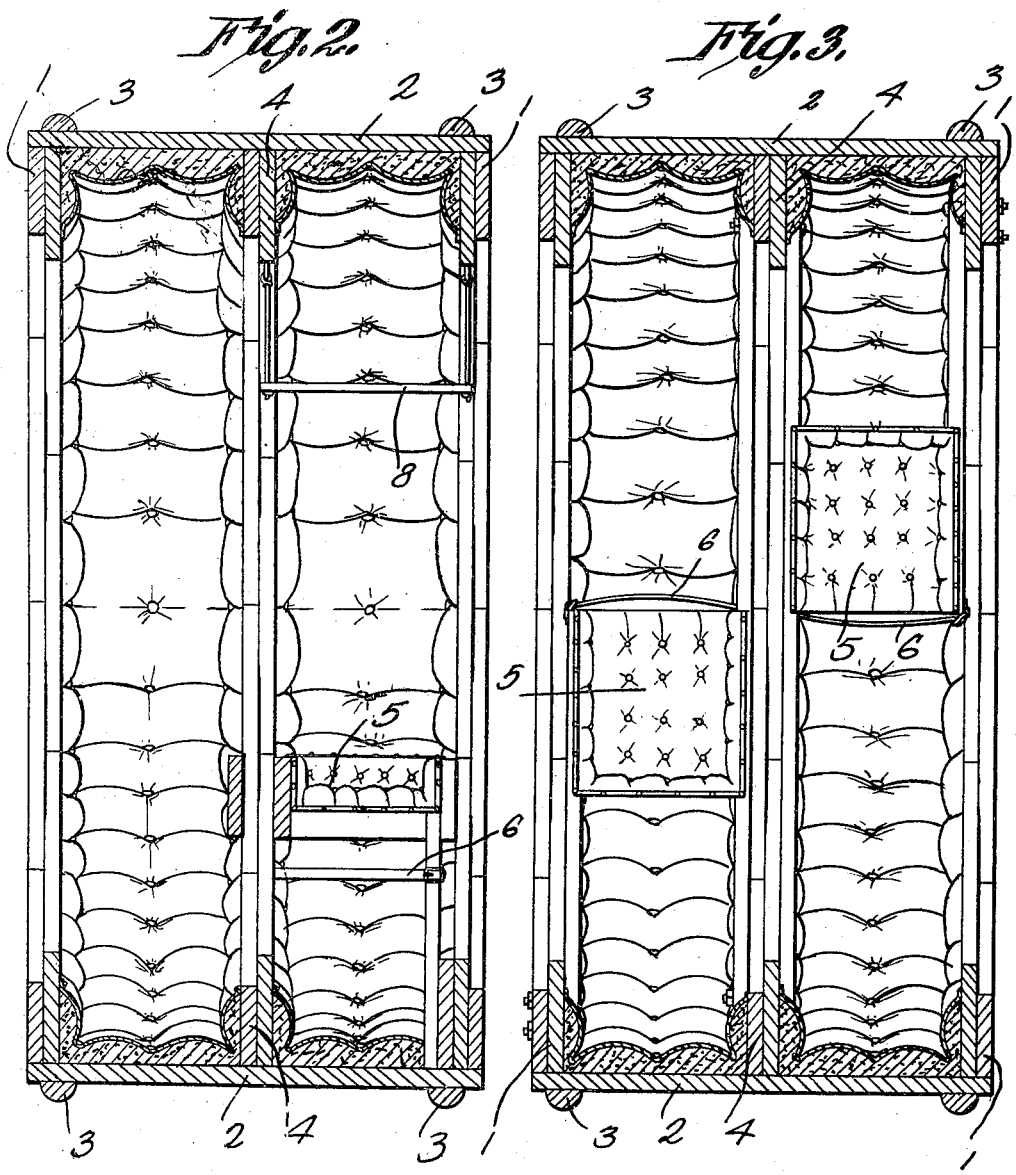

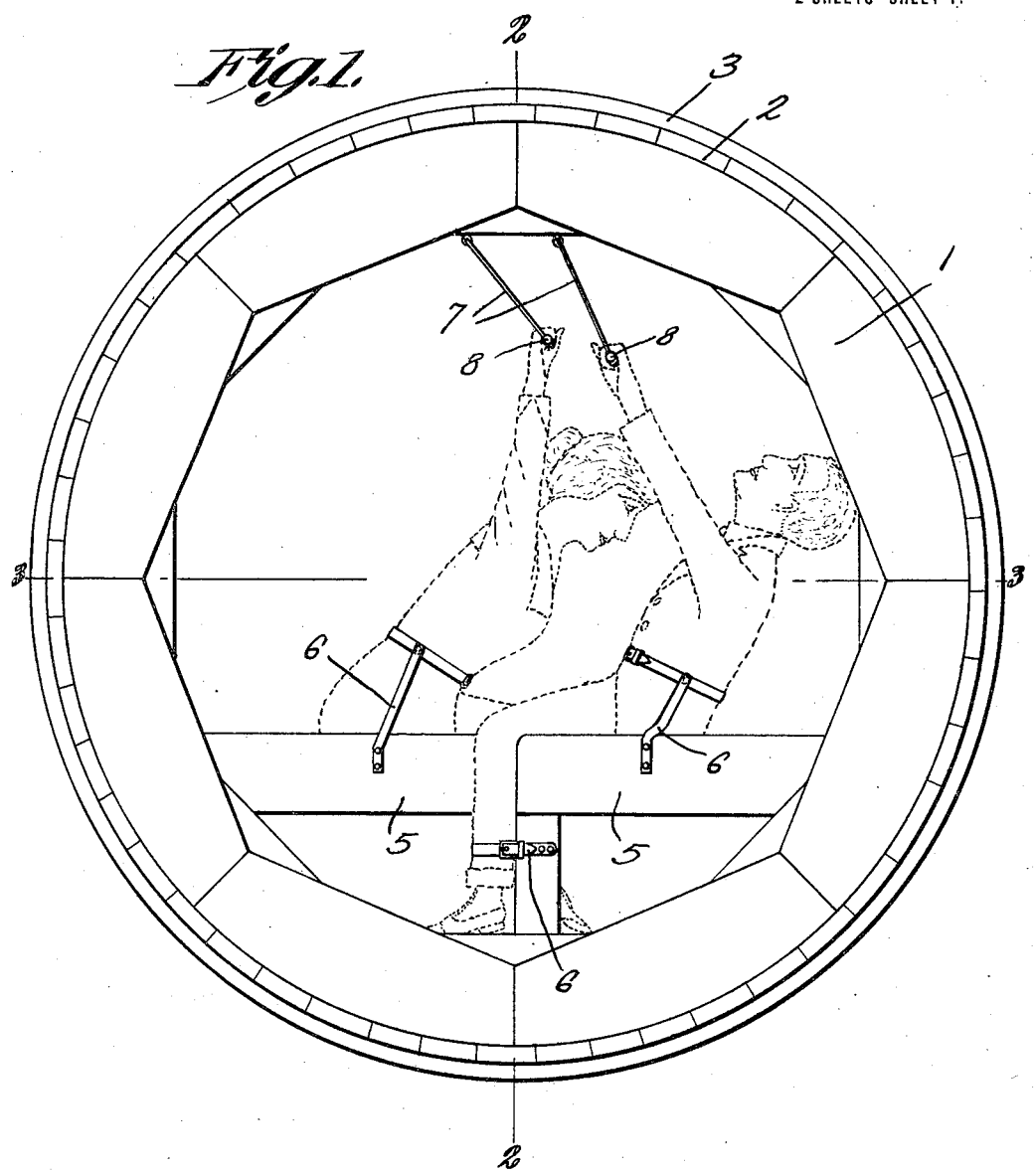

UNITED STATES PATENT OFFICE.

JOHN WILLIAM HINRICKS, OF WALCOTT, IOWA.

AMUSEMENT APPARATUS.

1,244,735. Specification of Letters Patent. Patented Oct. 30, 1917.

Application filed February 23, 1917. Serial No. 150,557.

*To all whom it may concern:*

Be it known that I, JOHN WILLIAM HINRICKS, having declared my intention to become a citizen of the United States, but am a subject of the Emperor of Germany, residing at Walcott, in the county of Scott and State of Iowa, have invented a new and useful Amusement Apparatus, of which the following is a specification.

This invention relates to amusement apparatus for use at pleasure resorts, and like places, one of the objects of the invention being to provide a car in the form of a drum adapted to be rotated back and forth by the movement of the occupant or occupants of the car, it being possible to give the car sufficient momentum to cause it to make a complete revolution and thereby cause the occupants to "loop the loop."

A further object is to provide an apparatus of this character which is simple and compact in construction and in which danger of injury to the occupant or occupants is reduced to the minimum.

Another object is to provide means within the car whereby the occupants can cause the car to operate in the manner desired.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side elevation of the apparatus in use.

Fig. 2 is a section on line 2—2 Fig. 1.

Fig. 3 is a section on line 3—3 Fig. 1.

Referring to the figures by characters of reference 1 designates spaced rims made up of segments of wood fastened together in any suitable manner, said segments being disposed in lapped relation as shown. The peripheries of the two rims are connected by slats 2 and secured to the periphery of the car at the sides thereof are tires 3 which can be of rubber or any other suitable material.

Where the car is to hold two passengers, a partition rim 4 is arranged midway between the rims 1 and mounted between the intermediate rim 4 and the side rims 1 are opposed seats 5 fixedly connected to said rims, one of said seats being located between one of the rims 1 and the intermediate rim 4, while the other seat is interposed between the intermediate rim 4 and the other rim 1. Thus two persons can occupy the seats facing in opposite directions respectively although not placed one in front of the other. Straps 6 or the like may be connected to the seats for attachment to the waists and legs of the occupants, as shown, thus preventing the occupants from falling from the seats when the car is inverted.

Connected to the rims 1 and 4 and above the front portions of the seats 5 are hangers 7 to which are attached grip bars 8.

The interior of the car is padded throughout so that should an occupant become unseated, injury would be avoided.

In using the apparatus the occupants strap themselves to the seats and then grasp the grips 8 thereabove. By swaying the body back and forth the car can be caused to roll back and forth, and ultimately sufficient momentum will be imparted thereto to cause it to make a complete revolution. The car can be mounted on a track or runway having abutments at its ends thus to limit the movement of the car or, if desired, the car instead of being cylindrical can be made frusto-conical so as to travel in a circle. While the car has been shown constructed to hold two persons, it can obviously be made to hold but one person or can be made to hold more than two persons.

What is claimed is:—

1. Amusement apparatus including a circular car mounted to rotate freely, means for securing a passenger within the car, and a swinging grip fastened within the car.

2. Amusement apparatus including a circular car mounted to roll freely, a seat fixedly secured within the car for supporting a passenger, and a grip supported within reach of the occupants of the seat.

3. Amusement apparatus including a circular car mounted to roll freely, a seat fixedly secured within the car for supporting a passenger, and a grip connected to the car and above the seat.

4. Amusement apparatus including a circular car mounted to roll freely, a seat fixedly secured within the car for supporting a passenger, and a grip connected to the car and above the seat, said grip being mounted for swinging movement.

In testimony that I claim the foregoing as my own, I have hereto affixed my signature in the presence of two witnesses.

JOHN WILLIAM HINRICKS.

Witnesses:
GEO. JEPSEN,
EMIL KNAACK.